(12) United States Patent
Kim (10) Patent No.: US 11,656,648 B1
(45) Date of Patent: May 23, 2023

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/878,537

(22) Filed: Aug. 1, 2022

(30) Foreign Application Priority Data

Feb. 25, 2022 (KR) .................. 10-2022-0025293

(51) Int. Cl.
| | |
|---|---|
| *G05G 1/30* | (2008.04) |
| *G05G 1/40* | (2008.04) |
| *G05G 1/42* | (2008.04) |
| *G05G 1/38* | (2008.04) |
| *G05G 5/05* | (2006.01) |

(Continued)

(52) U.S. Cl.
CPC .............. *G05G 1/40* (2013.01); *B60K 26/02* (2013.01); *B60T 7/042* (2013.01); *B60T 7/06* (2013.01); *G05G 1/01* (2013.01); *G05G 1/38* (2013.01); *G05G 1/42* (2013.01); *G05G 5/05* (2013.01);

(Continued)

(58) Field of Classification Search
CPC .. G05G 1/01; G05G 1/30; G05G 1/32; G05G 1/34; G05G 1/36; G05G 1/38; G05G 1/40; G05G 1/405; G05G 1/42; G05G 1/44; G05G 1/445; G05G 5/005; G05G 5/03; G05G 5/05; G05G 5/28; G05G 25/04; G05G 2505/00; B60K 26/02; B60K 2026/024; B60K 2026/026; B60T 7/04; B60T 7/042; B60T 7/06; B60T 7/065; B60R 21/09
See application file for complete search history.

(56) References Cited

U.S. PATENT DOCUMENTS 10,906,514 B1 * 2/2021 Kim ........................ G05G 5/03
10,946,741 B1 * 3/2021 Kim ........................ B60T 7/06
(Continued)

FOREIGN PATENT DOCUMENTS

DE 102019202888 A1 * 9/2020 ............... G05G 1/40
KR 2017137427 A * 12/2017 ............. B60K 26/02
(Continued)

OTHER PUBLICATIONS

Machine Translation of KR-2017137427-A.*
Machine Translation of KR-20210120154-A.*
Machine Translation of DE-102019202888-A1.*

*Primary Examiner* — Richard W Ridley
*Assistant Examiner* — Brian J McGovern
(74) *Attorney, Agent, or Firm* — Fox Rothschild LLP (57) ABSTRACT

A foldable pedal apparatus for a vehicle is provided. The foldable pedal apparatus is configured such that pedal pads protrude into an interior of a vehicle to be exposed toward a driver in a pop-up state in a manual driving mode in which the driver manually drives, and the pedal pads are inserted into a case on a footrest panel not to be exposed toward the driver in a hidden state in an autonomous driving mode in which the driver does not manually drive, and is configured to be able to operate and generate a signal related to a pedal function by pressure when the pedal pads have been popped up by pressure-based operating pedal assemblies.

20 Claims, 11 Drawing Sheets

(51) Int. Cl.
*G05G 1/01* (2008.04)
*B60T 7/06* (2006.01)
*B60T 7/04* (2006.01)
*G05G 25/04* (2006.01)
*B60K 26/02* (2006.01)

(52) U.S. Cl.
CPC ........ *G05G 25/04* (2013.01); *B60K 2026/026* (2013.01); *G05G 2505/00* (2013.01)

(56) References Cited

U.S. PATENT DOCUMENTS

| | | | |
|---|---|---|---|
| 11,021,058 B1* | 6/2021 | Kim | G05G 5/28 |
| 11,249,506 B1* | 2/2022 | Kim | G05G 5/28 |
| 11,312,236 B1* | 4/2022 | Kim | B60T 7/065 |
| 11,458,838 B1* | 10/2022 | Kim | B60T 7/06 |
| 11,465,498 B1* | 10/2022 | Kim | B60T 7/06 |
| 2009/0127015 A1* | 5/2009 | Van Saanen | B60T 7/06 |
| | | | 74/513 |
| 2020/0257329 A1* | 8/2020 | Kihara | B60T 7/06 |
| 2020/0262321 A1* | 8/2020 | Masu | B60N 3/063 |
| 2021/0331584 A1* | 10/2021 | Kim | G05G 1/40 |
| 2022/0001843 A1* | 1/2022 | Michael | B60K 26/02 |
| 2022/0011806 A1* | 1/2022 | Miletto | B60T 7/042 |
| 2022/0048384 A1* | 2/2022 | Kim | G05G 5/28 |
| 2023/0001788 A1* | 1/2023 | Hariu | B60K 26/02 |

FOREIGN PATENT DOCUMENTS

| | | | |
|---|---|---|---|
| KR | 10-2021-0125733 A | 10/2021 | |
| KR | 20210120154 A * | 10/2021 | ............... G05G 1/40 |

* cited by examiner

FIG. 11

FOLDABLE PEDAL APPARATUS FOR VEHICLE

CROSS REFERENCE TO RELATED APPLICATION

The present application is based on and claims under 35 U.S.C. § 119(a) the benefit of Korean Patent Application No. 10-2022-0025293, filed Feb. 25, 2022, the entire contents of which is incorporated herein for all purposes by this reference.

TECHNICAL FIELD

Embodiments of the present disclosure relate to a foldable pedal apparatus for a vehicle and, more particularly, to a foldable pedal apparatus for a vehicle of which a pedal pad protrudes toward a driver to be exposed such that the driver can operate the pedal pad in a manual driving mode in which the driver manually drives, and is hidden in the pedal housing not to be exposed to the driver such that the driver cannot operate the pedal pad in an autonomous driving situation.

BACKGROUND

An autonomous vehicle, which is a smart vehicle employing an autonomous technology going to a destination by itself even though a driver does not operate the steering wheel, accelerator pedal, brake, etc., is recently being rapidly developed.

If autonomous driving is generally used, a driver can select a manual driving mode in which the driver manually drives and an autonomous driving mode in which a vehicle goes by itself to a destination without the driver manually driving.

A driver should be able to take a rest in a comfortable position with his/her legs stretched in the autonomous driving mode. However, if pedals (the accelerator pedal and the brake pedal) disposed in the space under the driver seat keep exposed in the interior, they interfere with the driver taking a rest. Further, the autonomous driving situation is a situation in which a driver does not operate the pedals (the accelerator pedal and the brake pedal) in the vehicle, but if the driver operates a pedal during autonomous driving, a vehicle control unit determines it is a situation in which the driver wants to stop autonomous driving and manually drive, thereby stopping control for autonomous driving.

However, since the pedals are installed to be exposed in the space under the driver seat in a vehicle, there is a possibility that a driver unconsciously operates the pedals in the autonomous driving situation (misoperation of a pedal), and in this case, there is a possibility of an accident, depending on the road situation, the inter-vehicle distance, or the like.

Therefore, it is required to develop a pedal apparatus that exposes a pedal pad toward a driver such that the driver can operate the pedal pad in the manual driving mode in which the driver manually drives, and that hides the pedal pad such that the driver cannot operate the pedal pad for a comfortable rest and safety such as prevention of misoperation in the autonomous driving situation.

The description provided above as a related art of the present disclosure is just for helping to understanding the background of the present disclosure and should not be construed as being included in the related art known by those skilled in the art.

SUMMARY

An objective of the present disclosure is to provide a foldable pedal apparatus for a vehicle in which pedal pads protrude toward a driver to be exposed (pop-up state) such that the pedal pads can be operated by the driver in a manual driving mode in which the driver manually drives, and the pedal pads are hidden not to be exposed to the driver (hidden state) such that the pedal pads cannot be operated by the driver in an autonomous driving situation, thereby enabling the driver to comfortably take a rest in the autonomous driving situation and improving safety by preventing misoperation of the pedals in the autonomous driving situation.

Another objective of the present disclosure is to provide a foldable pedal apparatus for a vehicle that is a pressure-based pedal apparatus of which the manufacturing cost and the weight can be decreased through reduction of the number of parts and of which the size can be decreased through a compact configuration.

In order to achieve the objectives, a foldable pedal apparatus for a vehicle according to an embodiment of the present disclosure includes: a case fixed to a footrest panel and forming a hiding space between the footrest panel and the case; a rotary plate rotatably disposed on the footrest panel and rotating to be inserted into the hiding space or to come out of the hiding space; and a pressure-based operating pedal assembly disposed on the rotary plate, operated by pressure, and generating a signal related to a pedal function when being operated by a driver, in which when the rotary plate is rotated and the pressure-based operating pedal assembly is inserted into the case to be positioned in the hiding space, a hidden state in which a driver cannot operate the pressure-based operating pedal assembly is entered, and when the pressure-based operating pedal assembly comes out of the case and is exposed to an interior, a pop-up state in which a driver can operate the pressure-based operating pedal assembly is entered.

In some embodiments, the foldable pedal apparatus may further include a rotary motor fixed to the footrest panel, coupled to the rotary plate, and rotating the rotary plate when operating.

In some embodiments, a motor shaft of the rotary motor may be integrally coupled to the rotary plate, so the motor shaft and the rotary plat may be rotated together; and an end of the motor shaft may pass through the rotary plate and may be rotatably supported by the case.

In some embodiments, when the pressure-based operating pedal assembly is inserted in the hiding space, an operation gap that is a predetermined gap may be defined between an inner side of the case and the pressure-based operating pedal assembly.

In some embodiments, the pressure-based operating pedal assembly may include two assemblies that are the same in configuration; and any one of the two pressure-based operating pedal assemblies may be an accelerator pedal apparatus configured to generate a signal related to acceleration when being operated by a driver, and the other one may be a brake pedal apparatus configured to generate a signal related to braking.

In some embodiments, the pressure-based operating pedal assembly that is used as the accelerator pedal apparatus and the pressure-based operating pedal assembly that is used as the brake pedal apparatus may be spaced left and right apart from each other and disposed in different directions on the rotary plate.

In some embodiments, the rotary plate may be an assembly of an upper plate and a lower plate that overlap up and down each other; and the pressure-based operating pedal assembly may be installed to be supported by the lower plate with only a pad part thereof, which a driver operates, exposed out of the upper plate.

In some embodiments, the rotary plate may include an upper plate and a lower plate, and the pressure-based operating pedal assembly may include: a pedal pad protruding through the upper plate and configured to be operated by a driver; a pad damper overlapping the pedal pad from under; and a PCB fixed to the lower plate, having a pressure sensor configured to generate an electrical signal when the pedal pad is operated and the pad damper comes in contact with the pressure sensor, and configured to generate a signal related to a pedal function in response to a signal from the pressure sensor.

In some embodiments, the foldable pedal apparatus may further include a return spring installed such that both ends thereof is fixed to the lower plate and a middle portion thereof is in contact with the pedal pad, and configured to provide a return force to the pedal pad.

In some embodiments, the return spring may be a plate spring and two or more return springs may be disposed in contact with one pedal pad.

In some embodiments, a slot through which the return spring passes may be formed at the PCB by the number of the return spring; and the slot may be formed in a size that does not interfere with the PCB even though the return spring is in operation.

In some embodiments, an air gap that is a predetermined gap may be defined between the pad damper and the PCB having the pressure sensor when a driver does not operate the pedal pad.

In some embodiments, the pressure-based operating pedal assembly may include two pressure-based operating pedal assemblies, so any one of the two pressure-based operating pedal assemblies may be used as an accelerator pedal apparatus and the other one may be used as a brake pedal apparatus; and a pedal pad used for the brake pedal apparatus may be disposed to transversely extend and a pedal pad used for the accelerator pedal apparatus may be disposed to longitudinally extend.

In some embodiments, the pedal pad may have an operation part that a driver operates, and a flange part extending outward from an edge of the operation part; the flange part may be in close contact with an inner side of the upper plate and the operation part may protrude out of the upper plate through a pad hole formed at the upper plate; and a joint between the operation part and the flange part may be supported in contact with the pad hole.

In some embodiments, the case and the rotary plate having the pressure-based operating pedal assembly may be disposed on an inclined front surface of the footrest panel; and foreign substances at the case, or foreign substances at the pressure-based operating pedal assembly, or foreign substances at the rotary plate may be dropped and discharged by their own weight when the rotary plate is rotated, or may be dropped and discharged by locking of the case, or may be discharged by a centrifugal force of the rotary plate.

In some embodiments, the foldable pedal apparatus of the present disclosure is configured such that the pedal pads protrude toward the interior of a vehicle to enter the pop-up state and to be exposed to a driver such that the pedal pad can be operated by the driver in the manual driving mode in which the driver manually drives. Further, the pedal pads are inserted into the case at the footrest panel to enter the hidden state and not to be exposed to the driver such that the pedal pads cannot be operated by the driver in the autonomous driving mode in which the driver does not manually drive. Accordingly, there is an effect that the driver can comfortably take a rest in the autonomous driving situation and safety can be improved by preventing misoperation of the pedals in the autonomous driving situation.

Further, since the foldable pedal apparatus according to the present disclosure is configured to be operated by pressure to generate a signal related to a pedal function with the pedal pads popped up through the pressure-based operating pedal assemblies, there is an effect that it is possible to decrease the manufacturing cost by reducing the number of parts and to decrease the size by making the configuration compact.

Further, since the foldable pedal apparatus according to the present disclosure is configured such that the pedal pads of the pressure-based operating pedal assemblies are popped up or hidden by the rotary structure of the rotary plate, there is an effect that it is possible to maximally improve the design of the interior of a vehicle by minimizing the space for pop-up.

Further, since the foldable pedal apparatus according to the present disclosure is a pressure-based pedal apparatus that is simply operated and has a simple configuration, it is possible to decrease the manufacturing cost and the weight by reducing the number of parts and to decrease the size by making the configuration compact.

As discussed, the method and system suitably include use of a controller or processor.

In another embodiment, vehicles are provided that comprise a foldable pedal apparatus as disclosed herein.

In a fully autonomous vehicle or system, the vehicle may perform all driving tasks under all conditions and little or no driving assistance is required from a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all modifications, equivalents, and substitutions are included in the scope and spirit of the present disclosure.

It will be understood that, although the terms first, second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Terms used in the present disclosure are used only in order to describe specific exemplary embodiments rather than limiting the present disclosure. Singular forms are intended to include plural forms unless the context clearly indicates otherwise. It will be further understood that the terms "comprises" or "have" used in this specification specify the presence of stated features, numerals, steps, operations, components, parts, or a combination thereof, but do not preclude the presence or addition of one or more other features, numerals, steps, operations, components, parts, or a combination thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control unit (controller) according to exemplary embodiments of the present disclosure can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

A foldable pedal apparatus for a vehicle according to an exemplary embodiment of the present disclosure is described hereafter in detail with reference to the accompanying drawings.

A foldable pedal apparatus according to the present disclosure, as shown in FIGS. 1 to 11, may include: a case 100 fixed to a footrest panel 10 positioned under and ahead of a driver seat, and forming a hiding space 110 between the footrest panel 10 and the case 100; a rotary plate 200 rotatably disposed on the footrest panel 10 and rotating to be inserted into the hiding space 110 or to come out of the hiding space 110; and pressure-based operating pedal assemblies 300 disposed on the rotary plate 200, operated by pressure, and generating a signal related to a pedal function when being operated by a driver.

Figure 1:
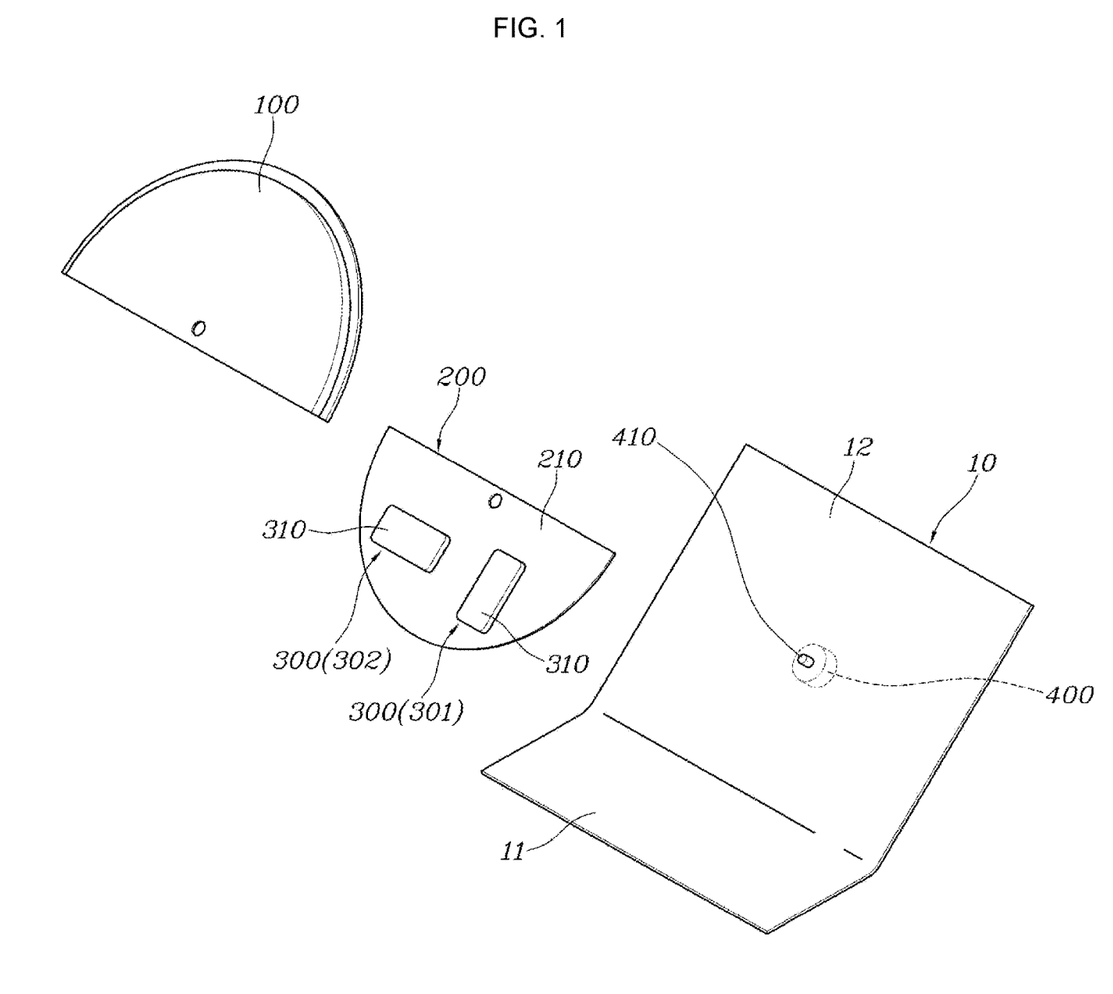
FIG. 1 is an exploded perspective view of a foldable pedal apparatus for a vehicle according to an embodiment of the present disclosure.
Figure 2:
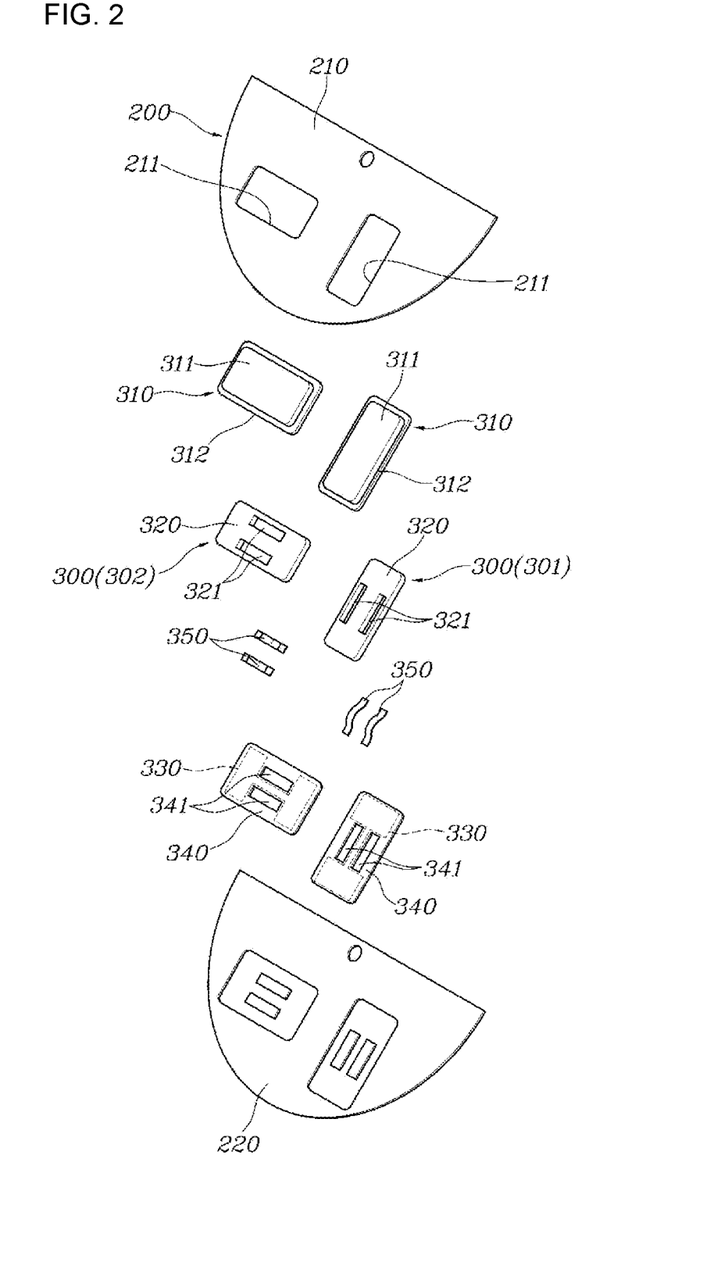
FIG. 2 is an exploded view of a rotary plate and pressure-based operating pedal assemblies shown in FIG. 1.
Figure 3:
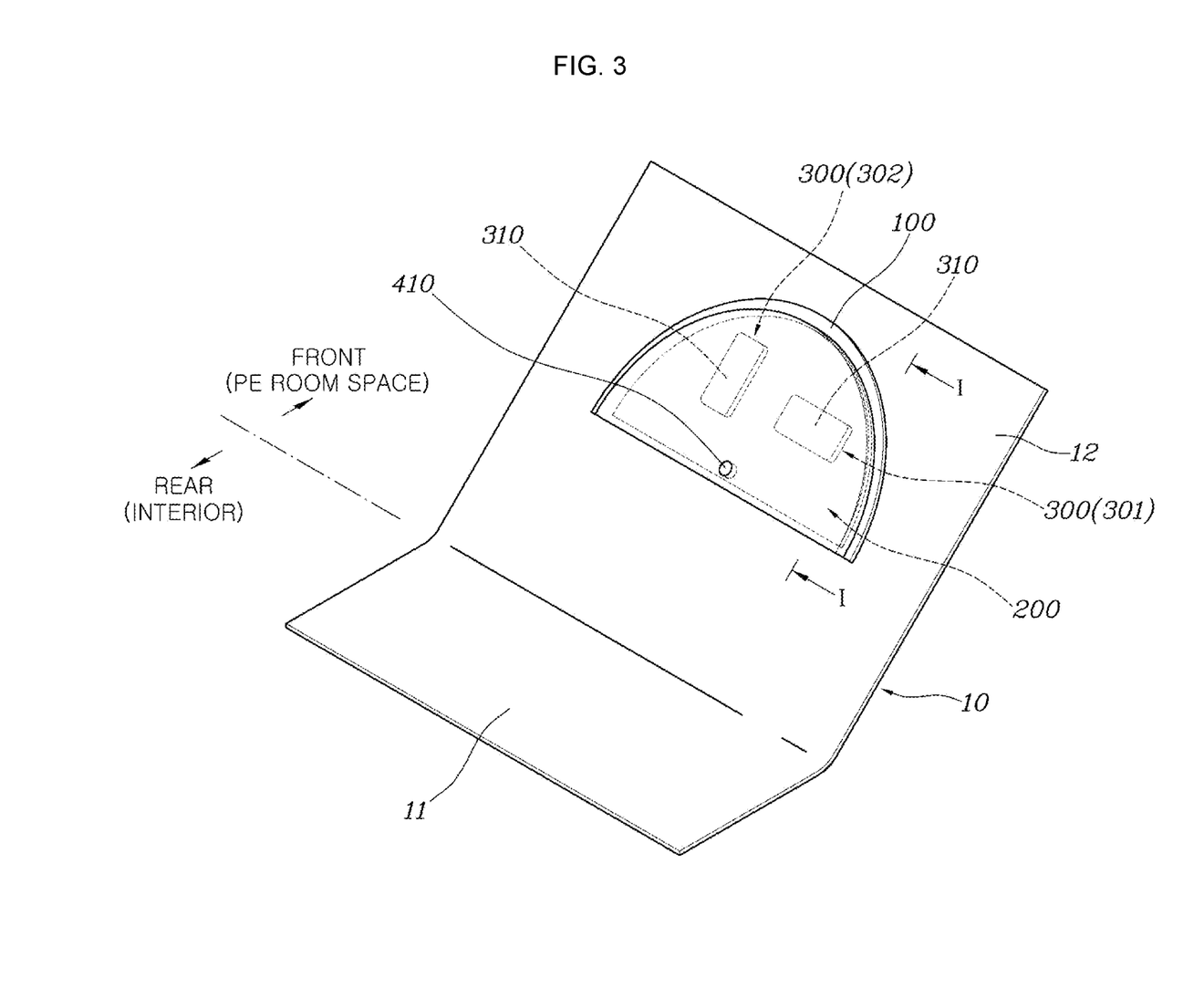
FIG. 3 is a view showing the assembly of the foldable pedal apparatus that is in a hidden state in which the pressure-based operating pedal assemblies are inserted in a case.
Figure 4:
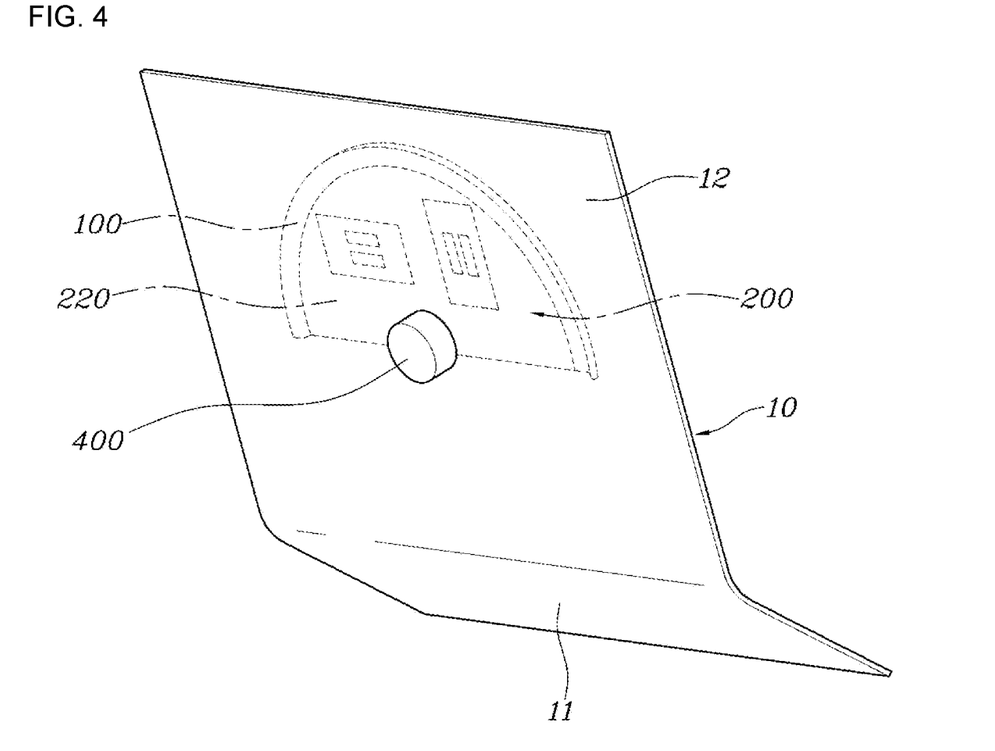
FIG. 4 is a view of FIG. 3 seen from the front.
Figure 5:
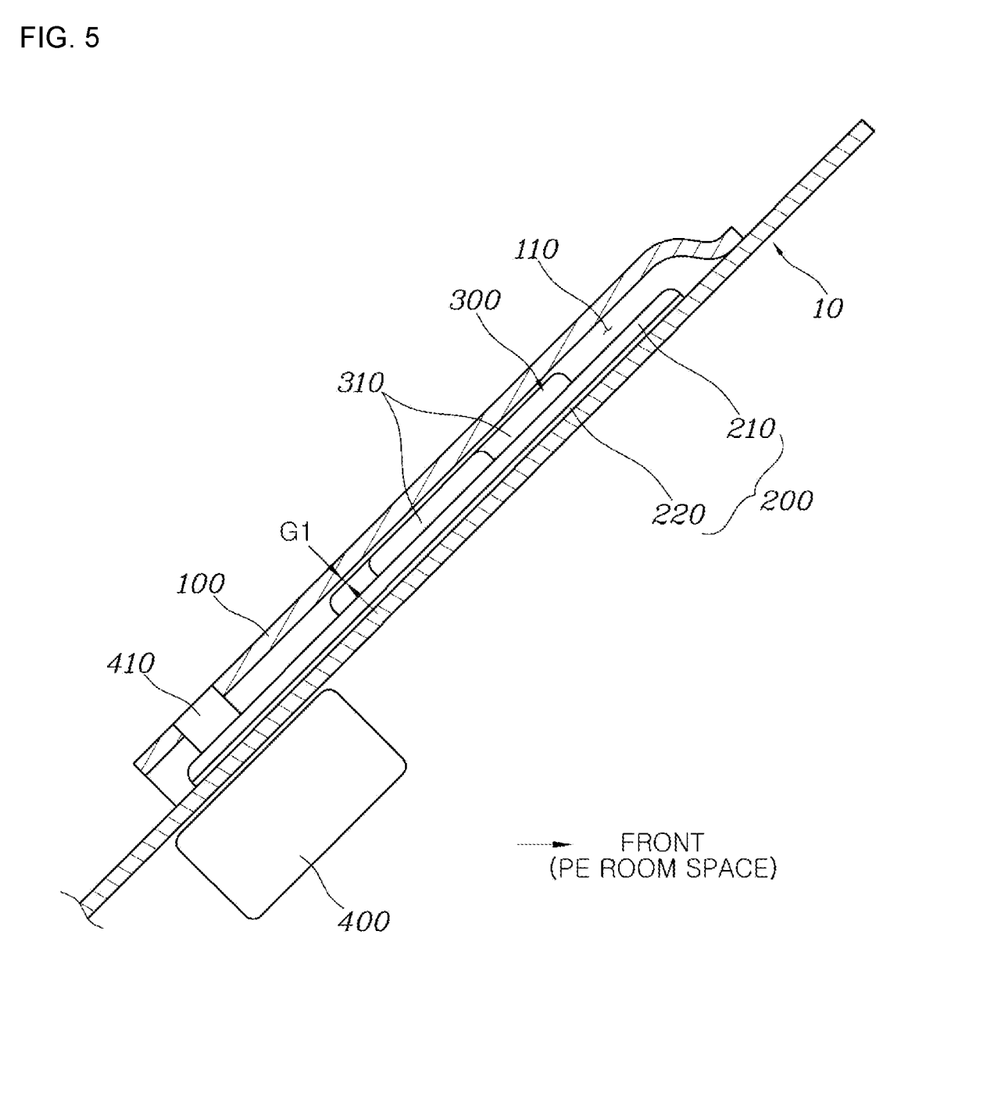
FIG. 5 is a cross-sectional view taken along line I-I of FIG. 3.
Figure 6:
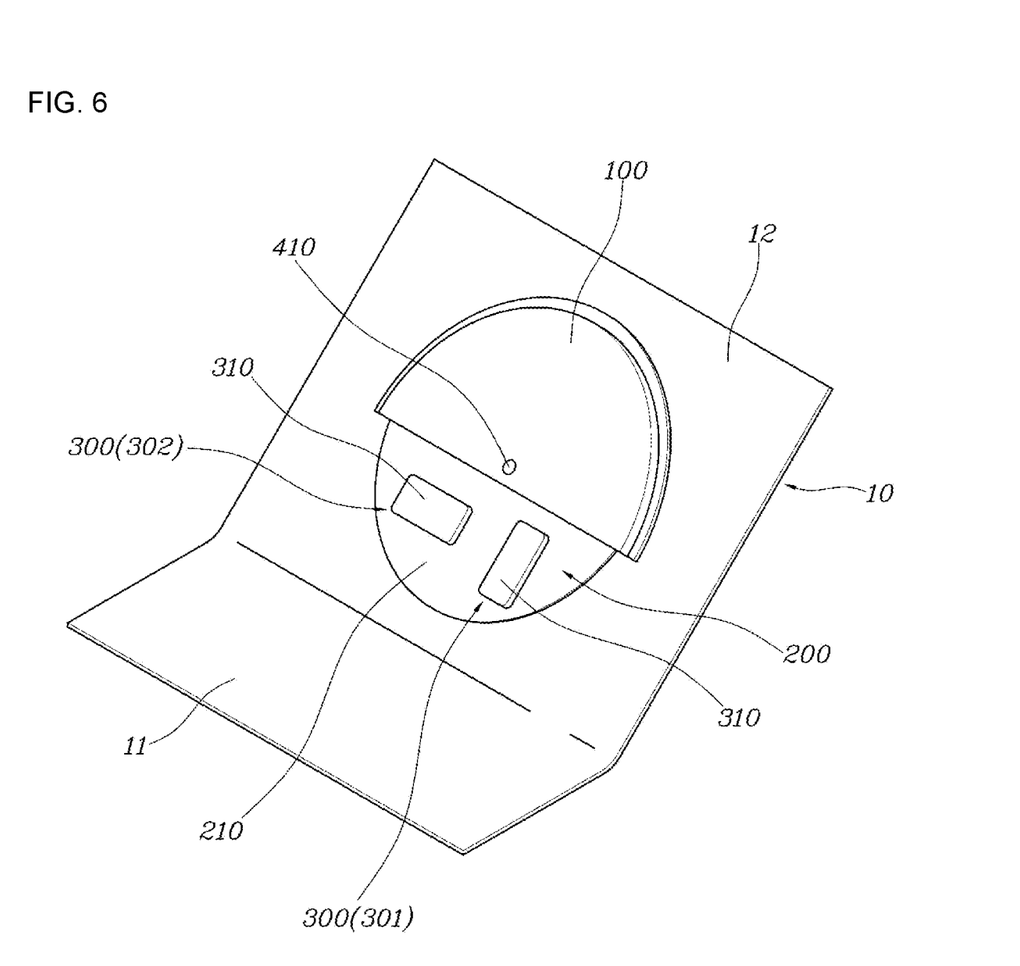
FIG. 6 is a view showing the state in which the pressure-based operating pedal assemblies have protruded out of the case.
Figure 7:
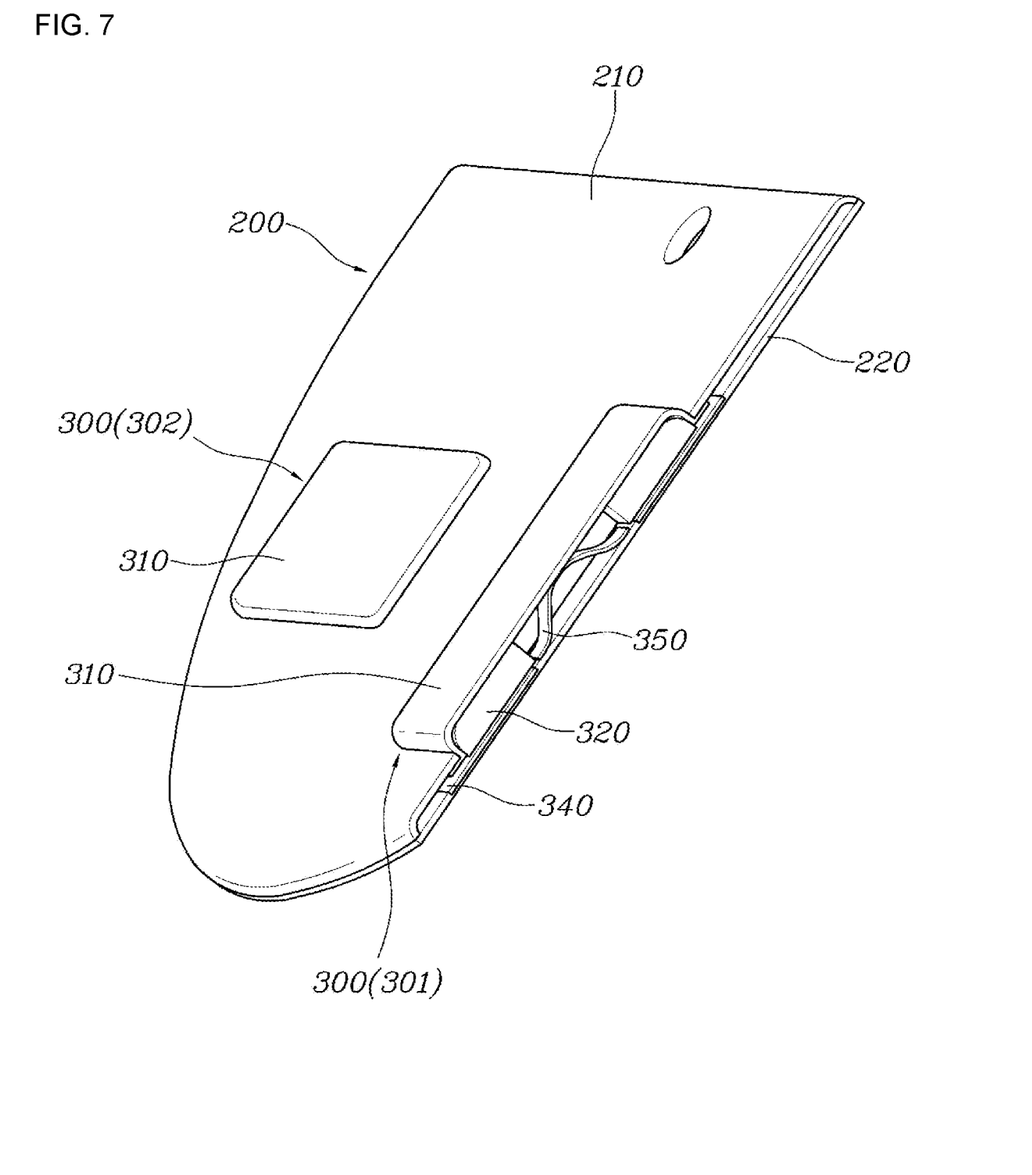
FIG. 7 is a partial cut view of the rotary plate combined with the pressure-based operating pedal assemblies in accordance with the present disclosure.
Figure 8:
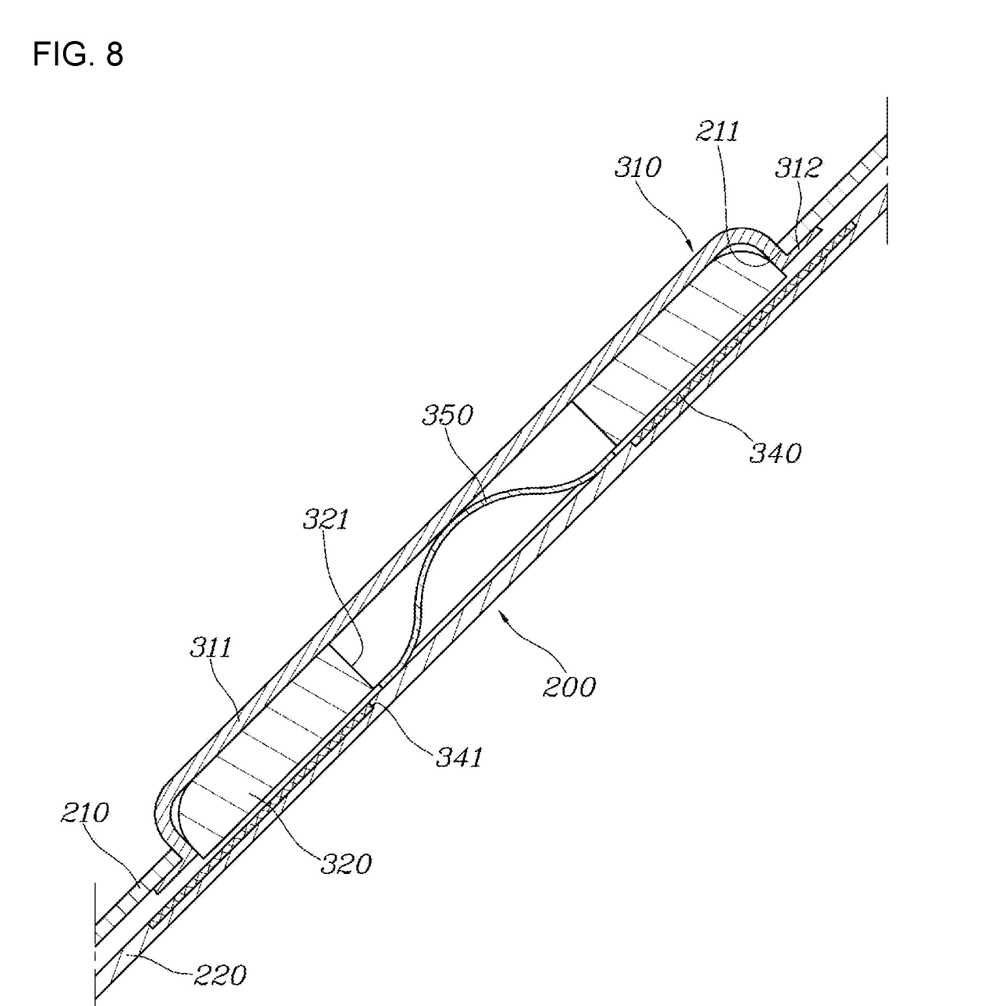
FIG. 8 is an enlarged view of the cut part of FIG. 7.
Figure 9:
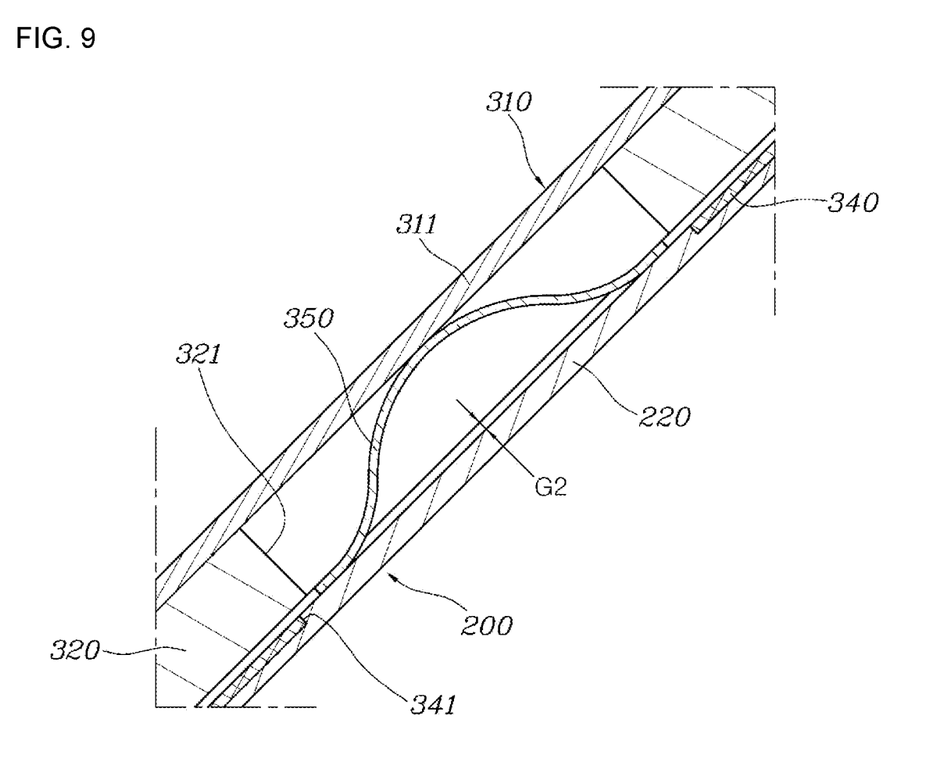
FIG. 9 is an enlarged view of the part where a return spring is installed in FIG. 8.

When the rotary plate 200 is rotated and the pressure-based operating pedal assemblies 300 are inserted into the case 100 to be positioned in the hiding space 110, a hidden state in which a driver cannot operate the pressure-based operating pedal assemblies 300 may be entered (see FIGS. 3 to 5). Further, when the rotary plate 200 is rotated and the pressure-based operating pedal assemblies 300 come out of the case 100 to be exposed to an interior, a pop-up state in which a driver can operate the pressure-based operating pedal assemblies 300 is entered (see FIG. 6).

The footrest panel 10 may include a base surface 11 and an inclined front surface 12 extending forward and upward from the base surface 11.

The foldable pedal apparatus according to the present disclosure may further include a rotary motor 400 fixed to the footrest panel 10, coupled to the rotary plate 100, and rotating the rotary plate 100 when operating.

The rotary motor 400 may be fixed to the inclined front surface 12 of the footrest panel 10 to be positioned in a Power Electronics (PE) room space ahead of the footrest panel 10.

In an electric vehicle, the front side of the footrest panel 10 may be a PE room space in which PE parts are positioned, and the rear side of the footrest panel 10 may be an interior in which a driver is positioned.

A motor shaft 410 of the rotary motor 400 may be rotatably disposed through the front surface 12 of the footrest panel 10 and integrally coupled to the rotary plate 200, so the motor shaft 410 and the rotary plate 200 are rotated together.

An end of the motor shaft 410 may pass through the rotary plate 200 and may be rotatably supported by the case 100, whereby a structure that stably supporting the motor shaft 410 can be secured.

According to an embodiment of the present disclosure, since only a hole that the motor shaft 410 passes is formed at the footrest panel 10 for installation and operation of the foldable pedal apparatus, it is possible to minimize holes formed at the footrest panel 10 and connected with a PE room, so it is possible to prevent noise and foreign substances from entering an interior and to maximally prevent permeation of moisture.

The rotary motor 400 may be an actuator that provides power to rotate the rotary plate 200 and can rotate both clockwise and counterclockwise. Further, a step motor may be used, so it is possible to stop rotation at a specific angle and to generate a restriction force that restricts rotation when stopping.

According to an embodiment of the present disclosure, the rotary motor 400 rotates 180° clockwise and counterclockwise and stops at the positions.

As shown in FIG. 5, in a hidden state in which the pressure-based operating pedal assemblies 300 are inserted in the case 100 to be positioned in the hiding space 110, an operation gap G1 that is a predetermined gap is defined between the inner side of the case 100 and the pressure-based operating pedal assemblies 300.

The operation gap G1 may be a space set to prevent interference between the case 100 and pedal pads constituting the pressure-based operating pedal assemblies 300, so when the rotary plate 200 is rotated, the pressure-based operating pedal assemblies 300 can be smoothly hidden and popped up.

The pressure-based operating pedal assemblies 300 may include two assemblies that are the same in configuration and spaced apart from each other on the rotary plate 200. Any one of the two pressure-based operating pedal assemblies 300 is an accelerator pedal apparatus 301 that generates a signal related to acceleration when being operated by a driver and the other one is a brake pedal apparatus 302 that generates a signal related to braking.

That is, in an embodiment of the present disclosure, the pressure-based operating pedal assembly 300 at the right on the rotary plate 200 may be the accelerator pedal apparatus 301 and the pressure-based operating pedal assembly 300 at the left is the brake pedal apparatus 302.

The pressure-based operating pedal assembly that is used as the accelerator pedal apparatus 301 and the pressure-based operating pedal assembly that is used as the brake pedal apparatus 302 may be disposed in different directions to prevent misoperation and improve safety in operation of pedals. For example, the accelerator pedal apparatus 301 may be longitudinally disposed and the brake pedal apparatus 302 may be transversely disposed.

The rotary plate 200 may be an assembly of an upper plate 210 and the lower plate that overlap up and down each other. The pressure-based operating pedal assemblies 300 are disposed to be supported by the lower plate 220 with only pads, which a driver operates, exposed out of the upper plate 210.

A space having a predetermined size may be provided between the upper plate 210 and the lower plate 220. A PCB, return spring, pad dampers, and pedal pads which will be described below are disposed in the space.

The pressure-based operating pedal assemblies 300 according to the present disclosure each may include: a pedal pad 310 protruding through the upper plate 210 and configured to be operated by a driver; a pad damper 320 overlapping the pedal pad 310 from under, a Printed Circuit Board (PCB) 340 fixed to the lower plate 220, including a pressure sensor 330 that generates an electrical signal when the pedal pad 310 is operated and the pad damper 320 comes in contact with the pressure sensor 330, and generating a signal related to a pedal function in response to a signal from the pressure sensor 330; and a return spring 350 having both ends fixed to the lower plate 220, having the middle portion being in contact with the pedal pad 310 between both ends, and providing a return force to the pedal pad 310.

As described above, the pressure-based operating pedal assemblies 300 may include two assemblies that are the same in configuration, in which one of them is the accelerator pedal apparatus 301 and the other one is the brake pedal apparatus 302.

Accordingly, the accelerator pedal apparatus 301 and the brake pedal apparatus 302 each may include the pedal pad 310, the pad damper 320, the pressure sensor 330, the PCB 340, and the return spring 350.

The pedal pad 310 that is used for the brake pedal apparatus 302 may be disposed to transversely extend and the pedal pad 310 that is used for the accelerator pedal apparatus 301 may be disposed to longitudinally extend, whereby it is possible to further prevent misoperation and improve safety in operation of pedals.

The pedal pad 310 that is used for the brake pedal apparatus 302 may be larger in size than the pedal pad 310 that is used for the accelerator pedal device 301. Accordingly, a driver can easily operate the brake pedal more than the accelerator pedal, so it is possible to prevent misoperation and improve safety in operation of the pedals.

The pedal pads 310 may each include an operation part 311 that a driver operates, and a flange part 321 extending outward from the edge of the operation part 311.

Figure 10:
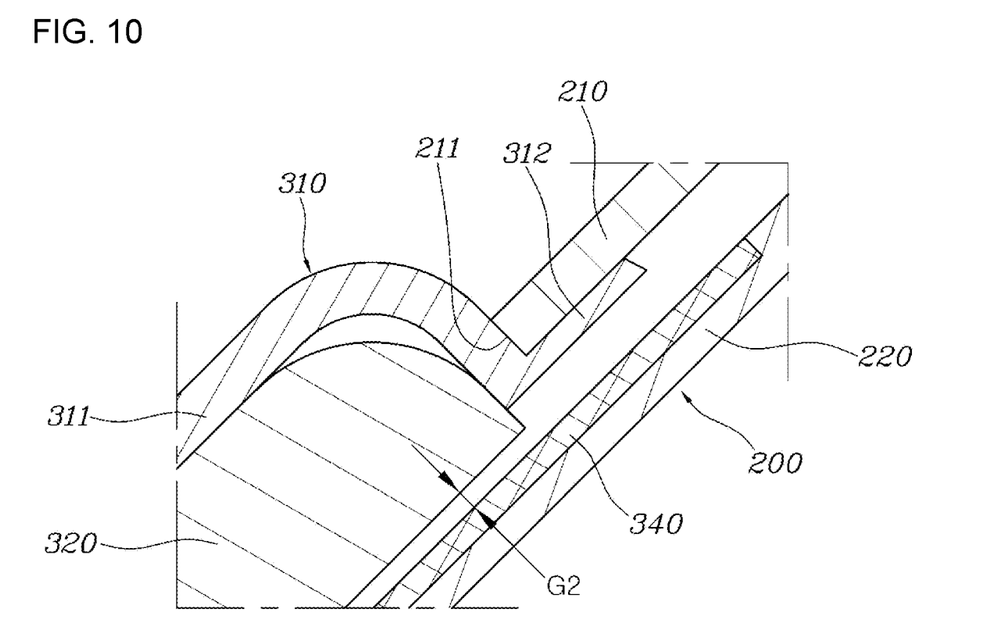
FIG. 10 is an enlarged view showing the part where a flange of a pedal pad is positioned in FIG. 8.
Figure 11:
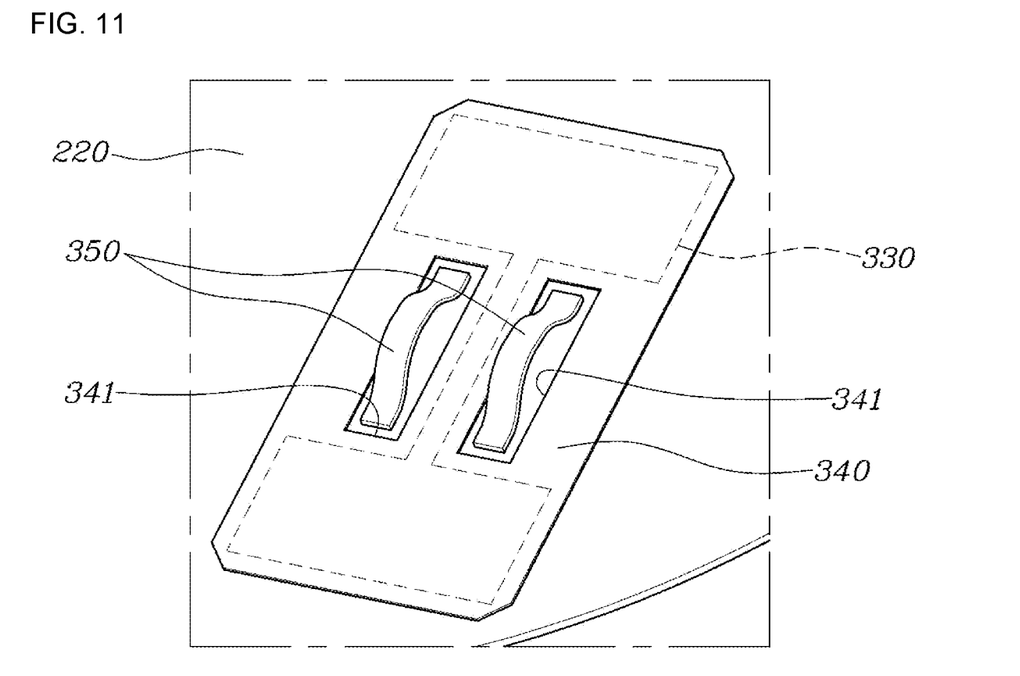
FIG. 11 is a view illustrating an installation structure of return springs according to an embodiment of the present disclosure.

As shown in FIG. 10, the flange part 321 may be in close contact with the inner side of the upper plate 210 and the operation part 311 may protrude out of the upper plate 210 through a pad hole 211 formed at the upper plate 210.

The joint between the operation part 311 and the flange part 312 may be supported in contact with the pad hole 211 of the upper plate 210. Accordingly, when a driver depresses the operation part 311 with a foot, the pedal pad 310 is not moved because it is supported by the pad hole 211 but the operation part 311 is depressed at the position, so the return spring 350 is compressed and the pad damper 320 moves and presses the pressure sensor 330 on the PCB 340.

The pad damper 320 may be made of rubber, but is not limited thereto.

The pressure sensor 330 may be integrated with the PCB 340, as in an embodiment of the present disclosure, or the pressure sensor 330 and the PCB 340 may be separately manufactured and then combined.

The PCB 340 of the accelerator pedal apparatus 301 may generate a signal related to acceleration in response to an electrical signal from the pressure sensor 330 and the PCB 340 of the brake pedal apparatus 302 may generate a signal related to braking in response to an electrical signal from the pressure sensor 330.

The larger the force that a driver applies to press the pedal pad 310 with a foot, the larger the force of the pad damper 320 pressing the pressure sensor 330, so a high voltage can be generated in this case.

The return spring 350 may serve to return the pedal pad 310 with a spring force. When a driver depresses the pedal pad 310 with a foot, the return spring 350 is compressed and accumulates elastic force, and when the driver releases the pedal pad 310, the return spring 350 is released and returns the pedal pad 310 to the initial position.

The return spring 350 may be a plate spring and two or more return springs may be disposed in contact with one pedal pad 310.

That is, two return springs 350 may be provided as a dual spring for each of the accelerator pedal apparatus 301 and the brake pedal apparatus 302 and the dual spring has a fail-safe function so that even if any one of two springs is damaged, the other one can normally work.

It is possible to tune a pedal effort by tuning the spring force of the return spring 350, and particularly, the spring forces of the two return springs 350 may be made different to be able to suppress fine vibration of the pedal pad 230.

The return spring 350 may be a compression coil spring.

In order to install the return spring 350, slots 321 and 341 through which the return spring 350 is disposed may be formed at the pad damper 320 and the PCB 340, respectively.

Both ends of the return spring may be fixed to the lower plate 220 and the middle portion of the return spring 350 protrudes in a convex arc shape, pass through the slots 321 and 341 of the pad damper 320 and the PCB 340, and be supported in contact with the inner side of the pedal pad 310.

Accordingly, an operation force by a driver may be transmitted to the return spring 350 through the pedal pad 310, the return spring 350 is slightly deformed rather than moving, thereby accumulating elastic force through compression.

The slots 321 and 341 formed at the pad damper 320 and the PCB 340 may be formed in a size that does not interfere with the return spring 350 that is in operation. In particular, the slot 341 of the PCB 340 may be formed larger than the return spring 350 so that the return spring 350 does not influence the PCB 340.

According to the foldable pedal apparatus according to the present disclosure, an air gap G2 that is a predetermined gap is defined between the pad damper 320 and the PCB 340 having the pressure sensor 330 when a driver does not operate the pedal pad 310.

An embodiment of the present disclosure includes the pressure-based operating pedal assemblies 300 that are configured such that the stroke of the pedal pad 310 is very short. Accordingly, by defining the air gap G2 that is a predetermined gap between the pad damper 320 and the PCB 340 having the pressure sensor 330, a driver can feel that the pedal pad 310 is being operated from the spring force of the return spring 350 when operating the pedal pad 310, so there is an advantage that misoperation can be prevented.

According to the pressure-based foldable pedal apparatus of the present disclosure, since the rotary plate 200 having the pressure-based operating pedal assemblies 300, the rotary motor, etc. may be all disposed on the front inclined surface 12 of the footrest panel 10. Accordingly, foreign substances at the case 100, or foreign substances at the pressure-based operating pedal assemblies 300, or foreign substances at the rotary plate 200 are dropped and discharged by their own weight when the rotary plate 200 is rotated, or are dropped and discharged by locking of the case 100, or are discharged by the centrifugal force of the rotary plate 200, whereby it is possible to minimize operation errors due to foreign substances.

As described above, the foldable pedal apparatus of the present disclosure may be configured such that the pedal pads 310 protrude toward the interior of a vehicle to enter the pop-up state and to be exposed to a driver such that the pedal pads 310 can be operated by the driver in the manual driving mode in which the driver manually drives. Further, the pedal pads 310 are inserted into the case 100 at the footrest panel 10 to enter the hidden state and not to be exposed to the driver such that the pedal pads 310 cannot be operated by the driver in the autonomous driving mode in which the driver does not manually drive. Accordingly, there is an advantage that the driver can comfortably take a rest in the autonomous driving situation and safety can be improved by preventing misoperation of the pedals in the autonomous driving situation.

Further, since the foldable pedal apparatus according to the present disclosure is configured to be operated by pressure to generate a signal related to a pedal function with the pedal pads 310 popped up through the pressure-based operating pedal assemblies 300, there is an advantage that it is possible to decrease the manufacturing cost by reducing the number of parts and to decrease the size by making the configuration compact.

Further, since the foldable pedal apparatus according to the present disclosure is configured such that the pedal pads 310 of the pressure-based operating pedal assemblies 300 are popped up or hidden by the rotary structure of the rotary plate 200, there is an advantage that it is possible to maximally improve the design of the interior of a vehicle by minimizing the space for pop-up.

Further, since the foldable pedal apparatus according to the present disclosure is a pressure-based pedal apparatus that is simply operated and has a simple configuration, it is possible to decrease the manufacturing cost and the weight by reducing the number of parts and to decrease the size by making the configuration compact.

Although the present disclosure was described with reference to specific embodiments shown in the drawings, it is apparent to those skilled in the art that the present disclosure may be changed and modified in various ways without departing from the scope of the present disclosure which is described in the following claims.

What is claimed is:

1. A foldable pedal apparatus for a vehicle, the foldable pedal apparatus comprising:
    a case fixed to a surface of a footrest panel facing a driver and forming a hiding space between the footrest panel and the case;
    a rotary plate rotatably disposed on the footrest panel and rotated to be inserted into the hiding space or to come out of the hiding space, wherein the rotary plate is rotatable about an axis that is non-parallel to the surface of the footrest panel; and
    a pressure-based operating pedal assembly disposed on the rotary plate, operated by pressure, and generating a signal related to a pedal function when being operated by the driver,
    wherein when the rotary plate is rotated and the pressure-based operating pedal assembly is inserted into the case to be positioned in the hiding space, a hidden state in which the driver cannot operate the pressure-based operating pedal assembly is entered, and when the pressure-based operating pedal assembly comes out of the case and is exposed to an interior, a pop-up state in which the driver can operate the pressure-based operating pedal assembly is entered.

2. The foldable pedal apparatus of claim 1, further comprising a rotary motor fixed to the footrest panel, coupled to the rotary plate, and rotating the rotary plate when operating.

3. The foldable pedal apparatus of claim 2, wherein a motor shaft of the rotary motor is integrally coupled to the rotary plate, so the motor shaft and the rotary plate are rotated together.

4. The foldable pedal apparatus of claim 3, wherein an end of the motor shaft passes through the rotary plate and is rotatably supported by the case.

5. The foldable pedal apparatus of claim 1, wherein when the pressure-based operating pedal assembly is inserted into the hiding space, an operation gap that is a predetermined gap is defined between an inner side of the case and the pressure-based operating pedal assembly.

6. The foldable pedal apparatus of claim 1, wherein the pressure-based operating pedal assembly comprises two pedal pad assemblies.

7. The foldable pedal apparatus of claim 6, wherein one of the two pedal pad assemblies is an accelerator pedal apparatus configured to generate a signal related to acceleration when being operated by the driver, and the other of the two pedal pad assemblies is a brake pedal apparatus configured to generate a signal related to braking.

8. The foldable pedal apparatus of claim 7, wherein the accelerator pedal apparatus and the brake pedal apparatus are spaced left and right apart from each other and disposed in different directions on the rotary plate.

9. The foldable pedal apparatus of claim 1, wherein the surface is an inclined front surface of the footrest panel; and
    foreign substances at the case, or foreign substances at the pressure-based operating pedal assembly, or foreign substances at the rotary plate are dropped and discharged by their own weight when the rotary plate is rotated, or are dropped and discharged by locking of the case, or are discharged by a centrifugal force of the rotary plate.

10. A vehicle comprising the foldable pedal apparatus of claim 1.

11. A foldable pedal apparatus for a vehicle, the foldable pedal apparatus comprising:
    a case fixed to a footrest panel and forming a hiding space between the footrest panel and the case;
    a rotary plate rotatably disposed on the footrest panel and rotated to be inserted into the hiding space or to come out of the hiding space; and
    a pressure-based operating pedal assembly disposed on the rotary plate, operated by pressure, and generating a signal related to a pedal function when being operated by a driver,
    wherein when the rotary plate is rotated and the pressure-based operating pedal assembly is inserted into the case to be positioned in the hiding space, a hidden state in which the driver cannot operate the pressure-based operating pedal assembly is entered, and when the pressure-based operating pedal assembly comes out of the case and is exposed to an interior, a pop-up state in which the driver can operate the pressure-based operating pedal assembly is entered;
    wherein the rotary plate is an assembly of an upper plate and a lower plate that overlap each other, wherein each of the upper and lower plates has a semi-circular shape.

12. The foldable pedal apparatus of claim 11, wherein the pressure-based operating pedal assembly is installed to be supported by the lower plate with only a pad part thereof, which the driver operates, exposed out of the upper plate.

13. A foldable pedal apparatus for a vehicle, the foldable pedal apparatus comprising:
    a case fixed to a footrest panel and forming a hiding space between the footrest panel and the case;
    a rotary plate rotatably disposed on the footrest panel and rotated to be inserted into the hiding space or to come out of the hiding space; and
    a pressure-based operating pedal assembly disposed on the rotary plate, operated by pressure, and generating a signal related to a pedal function when being operated by a driver,
    wherein when the rotary plate is rotated and the pressure-based operating pedal assembly is inserted into the case to be positioned in the hiding space, a hidden state in which the driver cannot operate the pressure-based operating pedal assembly is entered, and when the pressure-based operating pedal assembly comes out of the case and is exposed to an interior, a pop-up state in which the driver can operate the pressure-based operating pedal assembly is entered;

the rotary plate comprises an upper plate and a lower plate; and the pressure-based operating pedal assembly comprises:
- a pedal pad protruding through the upper plate and configured to be operated by the driver;
- a pad damper overlapping the pedal pad from under; and
- a printed circuit board (PCB) fixed to the lower plate, having a pressure sensor configured to generate an electrical signal when the pedal pad is operated and the pad damper comes in contact with the pressure sensor, and configured to generate the signal related to the pedal function in response to the electrical signal from the pressure sensor.

14. The foldable pedal apparatus of claim 13, further comprising a return spring installed such that opposed ends thereof are fixed to the lower plate and a middle portion thereof is in contact with the pedal pad, and configured to provide a return force to the pedal pad.

15. The foldable pedal apparatus of claim 14, wherein the return spring is a plate spring and two or more return springs are disposed in contact with the pedal pad.

16. The foldable pedal apparatus of claim 14, wherein a slot through which the return spring passes is formed at the PCB; and the slot is formed in a size that does not interfere with the PCB when the return spring is in operation.

17. The foldable pedal apparatus of claim 13, wherein an air gap that is a predetermined gap is defined between the pad damper and the PCB having the pressure sensor when the driver does not operate the pedal pad.

18. The foldable pedal apparatus of claim 13, wherein the pressure-based operating pedal assembly comprises two pressure-based operating pedal assemblies, wherein one of the two pressure-based operating pedal assemblies is used as an accelerator pedal apparatus and the other one is used as a brake pedal apparatus.

19. The foldable pedal apparatus of claim 18, wherein the pedal pad used for the brake pedal apparatus is disposed to transversely extend and the pedal pad used for the accelerator pedal apparatus is disposed to longitudinally extend.

20. The foldable pedal apparatus of claim 13, wherein the pedal pad has an operation part that the driver operates, and a flange part extending outward from an edge of the operation part;

the flange part is in contact with an inner side of the upper plate and the operation part protrudes out of the upper plate through a pad hole formed at the upper plate; and a joint between the operation part and the flange part is supported in contact with the pad hole.

* * * * *